(12) United States Patent
Matsubara (10) Patent No.: US 9,172,834 B2
(45) Date of Patent: Oct. 27, 2015

(54) IMAGE FORMING SYSTEM AND METHOD FOR RECOVERING IMAGE FORMING APPARATUS FROM THREE DIFFERENT POWER SAVING MODES

(71) Applicant: Konica Minolta, Inc., Tokyo (JP)

(72) Inventor: Masatomo Matsubara, Aichi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 71 days.

(21) Appl. No.: 14/029,894

(22) Filed: Sep. 18, 2013

(65) Prior Publication Data

US 2014/0085655 A1    Mar. 27, 2014

(30) Foreign Application Priority Data

Sep. 21, 2012    (JP) ................................. 2012-208973

(51) Int. Cl.
*H04N 1/00* (2006.01)
(52) U.S. Cl.
CPC ....... *H04N 1/00891* (2013.01); *H04N 1/00896* (2013.01); *H04N 1/00952* (2013.01); *H04N 2201/0039* (2013.01); *H04N 2201/0049* (2013.01); *H04N 2201/0055* (2013.01); *H04N 2201/0094* (2013.01)
(58) Field of Classification Search
None
See application file for complete search history.

(56) References Cited

U.S. PATENT DOCUMENTS

| | | | | |
|---|---|---|---|---|
| 2010/0083020 A1* | 4/2010 | Suzuki | ........................... | 713/322 |
| 2011/0004776 A1* | 1/2011 | Tanaka | ........................... | 713/323 |
| 2012/0030491 A1* | 2/2012 | Itou | ............................... | 713/323 |
| 2012/0173896 A1* | 7/2012 | Tanaka | ........................... | 713/300 |
| 2012/0236353 A1* | 9/2012 | Nagayama | .................... | 358/1.13 |
| 2012/0239953 A1* | 9/2012 | Kuroko | .......................... | 713/320 |
| 2013/0138986 A1* | 5/2013 | Park et al. | ...................... | 713/320 |
| 2013/0242327 A1* | 9/2013 | Matsunaga | ................... | 358/1.13 |
| 2014/0019785 A1* | 1/2014 | Tanaka | ........................... | 713/300 |

FOREIGN PATENT DOCUMENTS

| | | | |
|---|---|---|---|
| JP | 2002-144676 A | 5/2002 |
| JP | 2010-086068 A | 4/2010 |

OTHER PUBLICATIONS

Advanced Configuration and Powere Interface Specification, v. 50.0, pp. 613-630.*
Office Action (Notification of Reasons for Refusal) issued on Oct. 28, 2014, by the Japanese Patent Office in corresponding Japanese Patent Application No. 2012-208973 and an English translation of the Office Action. (6 pgs).

* cited by examiner

*Primary Examiner* — Nicholas Pachol
(74) *Attorney, Agent, or Firm* — Buchanan Ingersoll & Rooney PC (57) ABSTRACT

An image forming apparatus has the following three power saving modes: (1) a first power saving mode for cutting off power supply to the load; (2) a second power saving mode for cutting off power supply to the load and setting at least the CPU of the controller to STR state; and (3) a third power saving mode for providing power supply only to a wireless LAN module and the power supply cutoff controller, wherein to recover the image forming apparatus from the power saving mode, an external terminal implements both a second method of transmitting a certain type of packet to the wired LAN module and a third method of transmitting a certain type of packet to the wireless LAN module when the external terminal accesses the image forming apparatus at the application level.

10 Claims, 10 Drawing Sheets

| No. | Power Saving Mode | Recovery Method |
|---|---|---|
| 1 | Sleep Mode | Accessing the image forming apparatus at the application level |
| 2 | Deep Sleep Mode | Transmitting a certain type of packet to the wired LAN module |
| 3 | Erp Mode | Transmitting a certain type of packet to the wireless LAN module |

FIG. 9

| No. | Information |
|---|---|
| 1 | Wired network IP address |
| 2 | Wireless network IP address |
| 3 | SSID in handset mode |
| 4 | SSID in AP mode |
| 5 | Wireless network MAC address |
| 6 | IP address reached when last successfully accessed MFP |
| 7 | SSID of AP reached when last successfully accessed MFP |

IMAGE FORMING SYSTEM AND METHOD FOR RECOVERING IMAGE FORMING APPARATUS FROM THREE DIFFERENT POWER SAVING MODES

This application claims priority under 35 U.S.C. §119 to Japanese Patent Application No. 2012-208973 filed on Sep. 21, 2012, the entire disclosure of which is incorporated herein by reference in its entirety.

BACKGROUND OF THE INVENTION

1. Field of the Invention

The present invention relates to: an image forming system provided with: an image forming apparatus having multiple power saving modes; an external terminal capable of accessing the image forming apparatus via a network to remotely operate the image forming apparatus; a method for the image forming system to recover the image forming apparatus from power saving mode; the image forming apparatus; the external terminal; and recoding medium.

2. Description of the Related Art

The following description sets forth the inventor's knowledge of related art and problems therein and should not be construed as an admission of knowledge in the prior art.

There has been known an image forming apparatus such as a multi-function peripheral (MFP), i.e., a multifunctional digital machine, having the following three power saving modes by which to internally provide power supply in different manners:

(1) a first power saving mode for cutting off power supply to a load;

(2) a second power saving mode for cutting off power supply to a load and switch at least a CPU of a controller to suspend-to-ram (STR) state; and (3) a third power saving mode for providing power supply only to a wireless LAN module and a power supply cutoff controller that determines whether power supply to a load should be cut off or provided.

When recovering from the second power saving mode, an image forming apparatus needs to switch its behavior depending on the cause of recovery; however, if recovering from the second power saving mode by the method of recovering from the third power saving mode, an image forming apparatus could not switch its behavior because of not being able to detect the cause of recovery.

An external terminal, a portable one for example, may access an image forming apparatus via multiple access paths; however, it would be hardly possible for such a portable terminal to detect the power saving mode which the image forming apparatus is presently in.

Japanese Unexamined Patent Publication No. 2002-144676 teaches a technique of improving the convenience of a user when he/she conducts a wireless communication by operating an image forming apparatus having a wireless communication function. Specifically, the technique is a multi-functional machine having power saving mode and standby mode, and the multifunctional machine is provided with: a receiver that is capable of detecting wireless information signals from a terminal apparatus; and a controller that switches the operation mode to standby mode if the receiver receives a wireless information signal from a terminal apparatus while the multifunctional machine is in power saving mode.

In Japanese Unexamined Patent Publication No. 2002-144676, the multifunctional machine is at least allowed to terminate power saving mode if receiving a wireless signal from an external terminal while it is in power saving mode and there is no disclosure of such a method as described above for an external terminal to recover an image forming apparatus having multiple power saving modes, from any of the power saving modes.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an image forming system comprising: an image forming apparatus and an external terminal being connected to each other via a network, the external terminal being capable of operating the image forming apparatus, the image forming apparatus comprising:

a controller comprising: a CPU containing an embedded wired LAN module, the CPU having a STR function for reducing power consumption by cutting off core power supply and a recovery function for terminating the STR function by restoring core power supply when the wired LAN module receives a certain type of packet; and a wireless LAN module having a control function for outputting a control signal when the wireless LAN module receives a certain type of packet while the image forming apparatus is saving power; and a power supply cutoff controller that controls cutting off or providing power supply to a load, wherein the wireless LAN module outputs a control signal to the power supply cutoff controller; and if the control signal is effective, the power supply cutoff controller provides power supply to the load, the image forming apparatus having the following three power saving modes:

(1) a first power saving mode for cutting off power supply to the load;

(2) a second power saving mode for cutting off power supply to the load and setting at least the CPU of the controller to STR state; and (3) a third power saving mode for providing power supply only to a wireless LAN module and the power supply cutoff controller, the external terminal being capable of recovering the image forming apparatus from the first, second, and third power saving mode by the following respective methods:

(1) a first method of accessing the image forming apparatus at the application level;

(2) a second method of transmitting a certain type of packet to the wired LAN module; and (3) a third method of transmitting a certain type of packet to the wireless LAN module, wherein the external terminal implements both the second and third method when the external terminal accesses the image forming apparatus at the application level.

A second aspect of the present invention relates to a method for an image forming system comprising an image forming apparatus and an external terminal being connected to each other via a network, the external terminal being capable of operating the image forming apparatus, the method allowing the external terminal to recover the image forming apparatus from power saving mode, the image forming apparatus comprising:

a controller comprising: a CPU containing an embedded wired LAN module, the CPU having a STR function for reducing power consumption by cutting off core power supply and a recovery function for terminating the STR function by restoring core power supply when the wired LAN module receives a certain type of packet; and a wireless LAN module having a control function for outputting a control signal when the wireless LAN module receives a certain type of packet while the image forming apparatus is saving power; and a power supply cutoff controller that controls cutting off or providing power supply to a load,
wherein the wireless LAN module outputs a control signal to the power supply cutoff controller; and if the control signal is effective, the power supply cutoff controller provides power supply to the load, the image forming apparatus having the following three power saving modes:

(1) a first power saving mode for cutting off power supply to the load;

(2) a second power saving mode for cutting off power supply to the load and setting at least the CPU of the controller to STR state; and (3) a third power saving mode for providing power supply only to a wireless LAN module and the power supply cutoff controller, the external terminal being capable of recovering the image forming apparatus from the first, second, and third power saving mode by the following respective methods:

(1) a first method of accessing the image forming apparatus at the application level;

(2) a second method of transmitting a certain type of packet to the wired LAN module; and (3) a third method of transmitting a certain type of packet to the wireless LAN module, wherein the external terminal implements both the second and third method when the external terminal accesses the image forming apparatus at the application level.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one embodiment of the present invention will be described in combination with the accompanying drawings.

Figure 1:
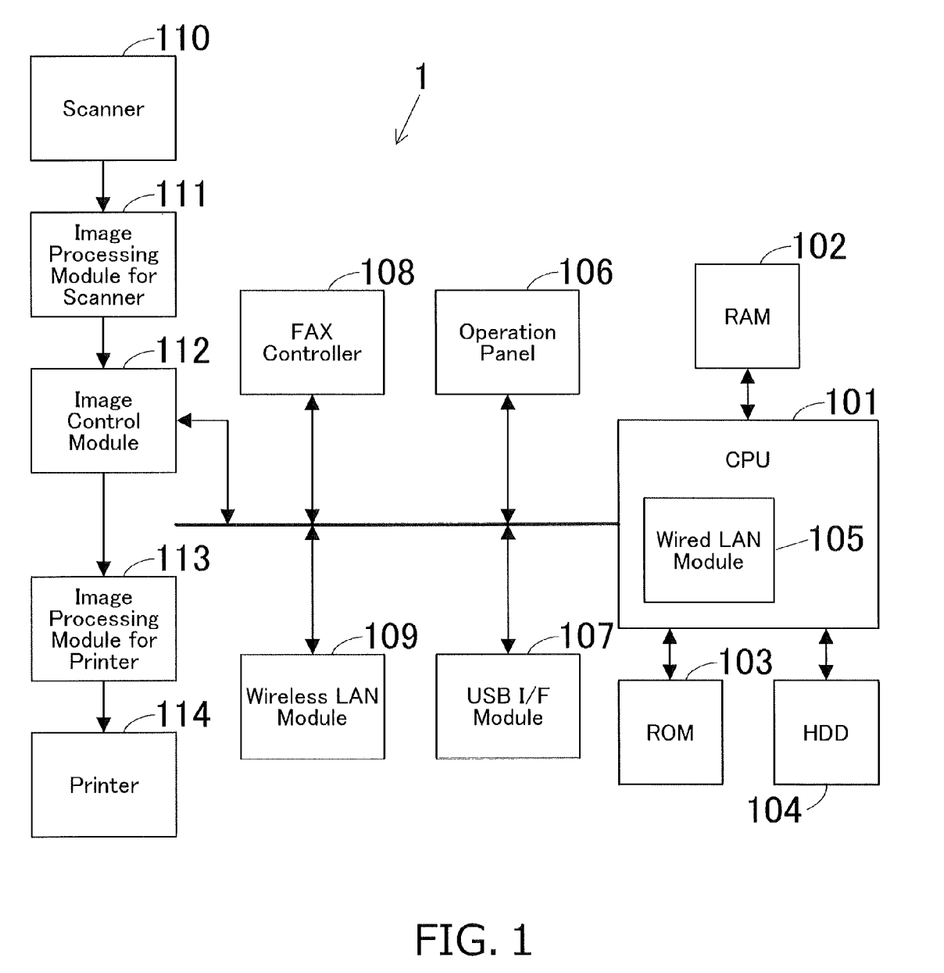
FIG. 1 is a block diagram illustrating a configuration of an image forming apparatus to be employed in an image forming system according to one embodiment of the present invention.

FIG. 1 is a block diagram illustrating a configuration of an image forming apparatus according to one embodiment of the present invention. In this embodiment, a multifunction peripheral (MFP), i.e., a multifunctional digital machine is employed as an image forming apparatus. Hereinafter, an image forming apparatus will also be referred to as MFP.

As illustrated in FIG. 1, an MFP 1 is provided with: a CPU 101 that controls the entire MFP 1; a wired network module 105 in the CPU 101, which performs network communications; a RAM 102 that serves as a work area for the CPU 101 to perform processing; a ROM 103 that stores operation programs for the CPU 101 and other data; a memory 104 that is composed of a hard disk drive (HDD) storing images and other data; an operation panel 106 that serves for user input and displays operation screens and the like; a scanner 110 that scans a physical document to obtain images; an image processing module 111 that performs image processing on images obtained by scanning a physical document; an image control module 112 that controls the size of images; an image processing module 113 that performs image processing on images for printing; a printer 114 that performs printing; a FAX controller 108 that performs facsimile communications; an USB interface (I/F) module 114 that serves as a connector to a USB device; and a wireless local area network (LAN) module 109 that performs wireless communications with external terminals.

The CPU 101 and the wireless LAN module 109 primarily compose a MFP controller 122.

Figure 2:
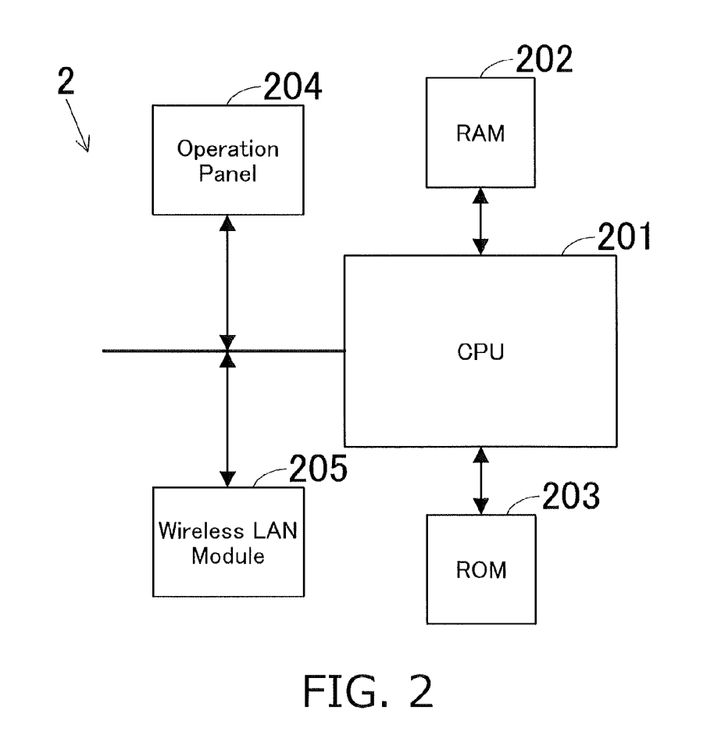
FIG. 2 is a block diagram illustrating a configuration of an external terminal.

FIG. 2 is a block diagram illustrating a configuration of a portable terminal 2 as an external terminal cooperatively working with the MFP 1 of FIG. 1.

The portable terminal 2 is provided with: a CPU 201 that controls the entire portable terminal 2; a RAM 202 that serves as a work area for the CPU 201 to perform processing; a RAM 203 that stores data; an operation panel 204 that serves for user input and displays operation screens and the like; a wireless LAN module 205 that performs wireless communications with the MFP 1; and the like.

In this embodiment, a user who operates the portable terminal 2 can obtain an interface image, which is displayed on the operation panel 106 of the MFP 1, by accessing the MFP 1 at the application level via the network and remotely operate the MFP 1 simply by touching on the operation panel 204 of the portable terminal 2 just like doing the same on the operation panel 106 of the MFP 1. This means that the portable terminal 2 has equivalent functions to those of the operation panel 106 of the MFP 1.

Figure 3:
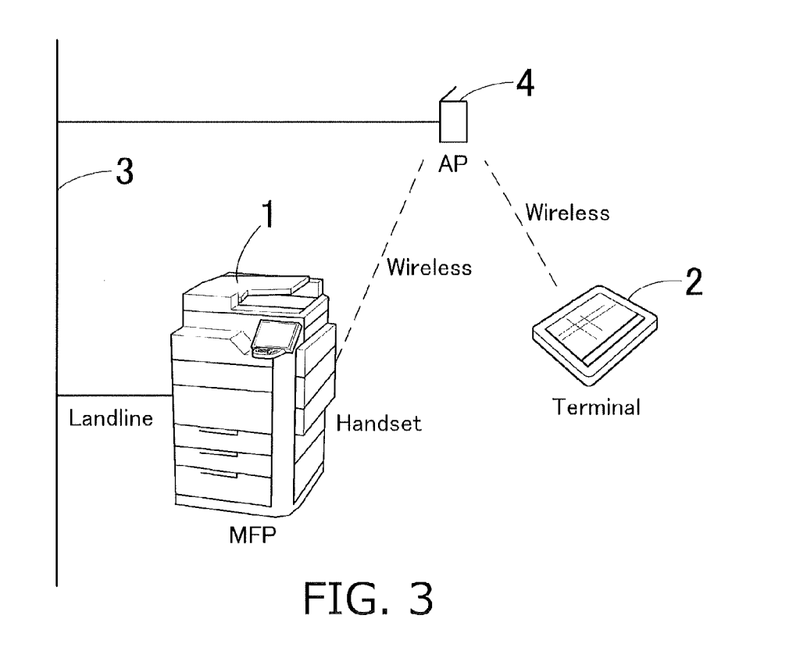
FIG. 3 illustrates a first example of a network configuration of the image forming system of FIG. 1.

FIG. 3 is a first example of a network configuration how the MFP 1 of FIG. 1 and the portable terminal 2 are connected to each other.

In this example, the MFP 1 is connected to a network 3 via a wired LAN device and a wireless LAN device: the portable terminal (hereinafter will be also referred to as "terminal") 2 is wirelessly connected to the network 3 via a wireless access point ("access point" will be also referred to as "AP") 4 and the MFP 1 and the terminal 2 therefore are connected to each other via the network 3.

Figure 4:
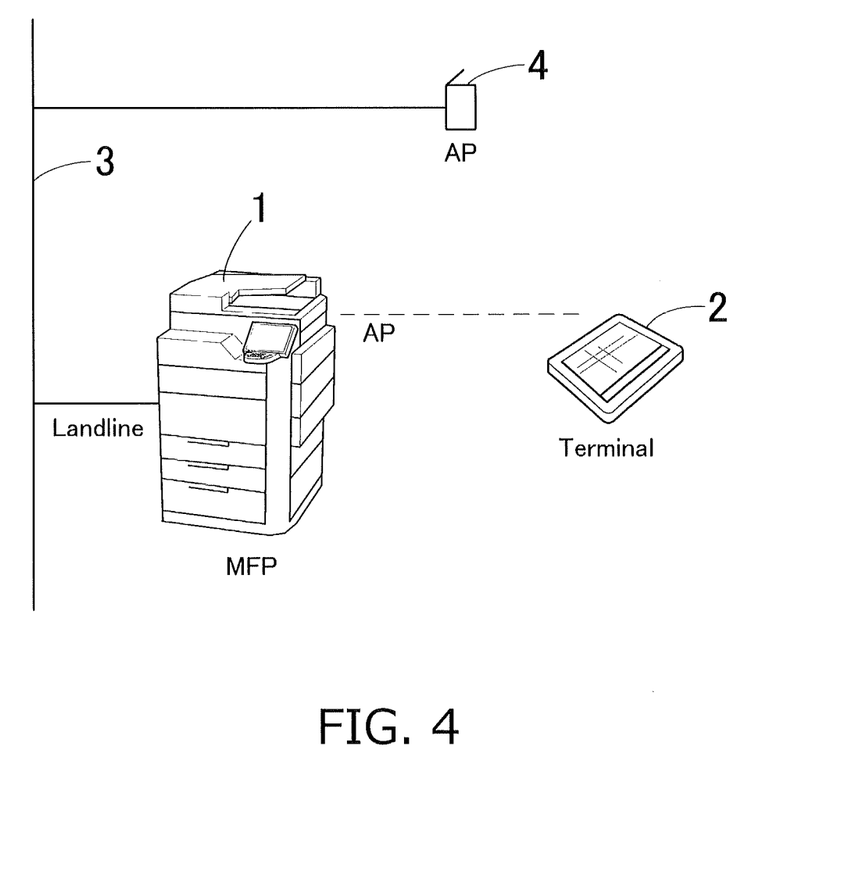
FIG. 4 illustrates the first example again.

FIG. 4 is a second example of a network configuration how the MFP 1 of FIG. 1 and the portable terminal 2 are connected to each other. In this example, the MFP 1 and the portable terminal 2 are connected to each other in peer-to-peer (P2P) fashion.

The MFP 1 can be in multiple power saving states (power saving modes).

Figure 5:
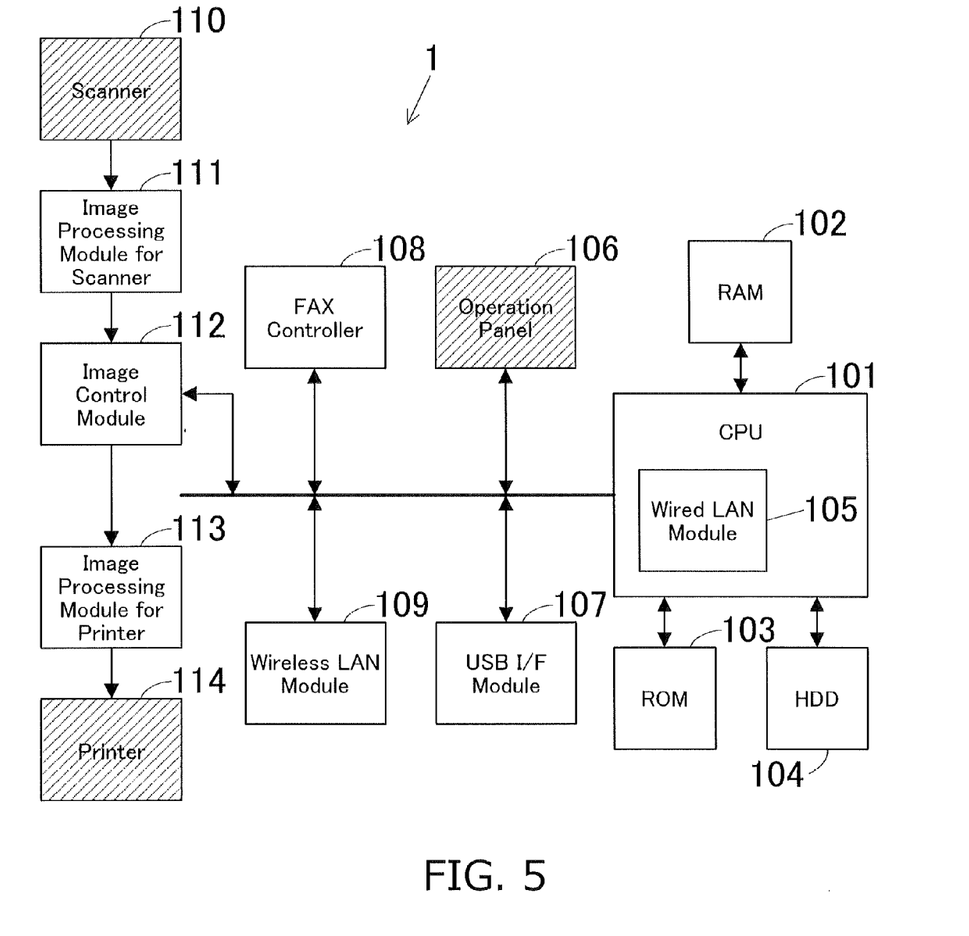
FIG. 5 illustrates how the image forming apparatus internally provides power supply when it is in a first power saving mode.

FIG. 5 illustrates how the MFP 1 internally provides power supply when it is in a first power saving mode (will be also referred to as "sleep mode").

In sleep mode, the operation panel 106, the scanner 110, and the printer 114 of the MFP 1 lose power supply to fall in power saving state; to the contrary, the MFP controller 122, which includes the CPU 101 and the wireless LAN module 109, is not in power saving state. The shadowed blocks in this figure are these portions without power supply. Those in FIGS. 6 and 7 are the same.

Figure 6:
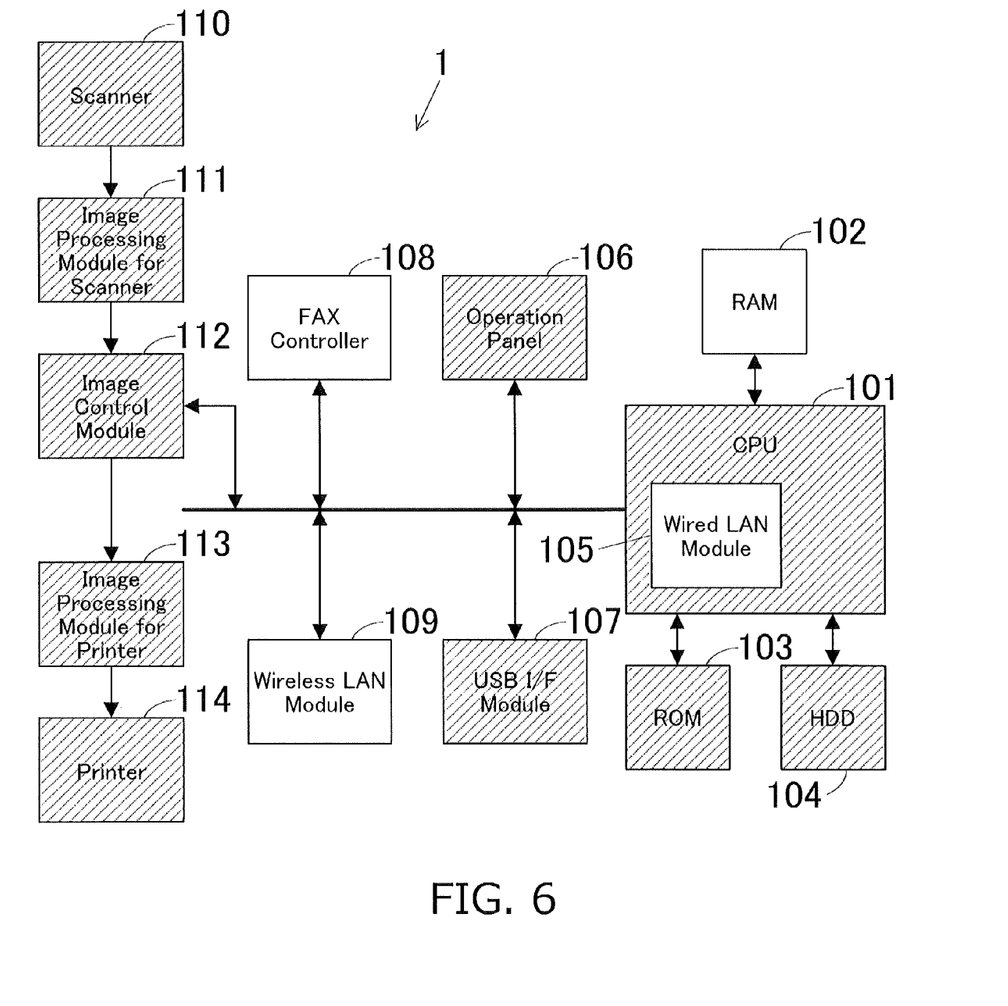
FIG. 6 illustrates how the image forming apparatus internally provides power supply when it is in a second power saving mode.
Figure 7:
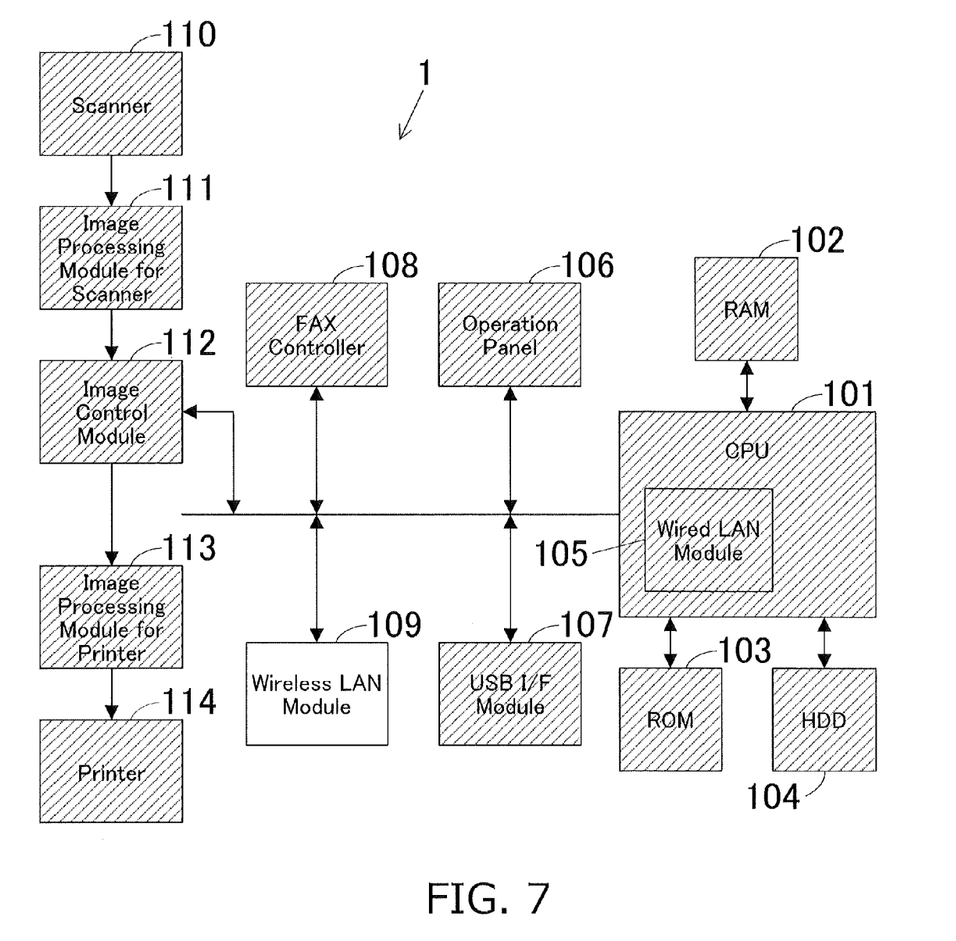
FIG. 7 illustrates how the image forming apparatus internally provides power supply when it is in a third power saving mode.

FIG. 6 illustrates how the MFP 1 internally provides power supply when it is in a second power saving mode (will be also referred to as "deep sleep mode").

On step further, in deep sleep mode, the operation panel 106, the scanner 110, the printer 114, and the MFP controller 122 all lose power supply to fall in power saving state; in addition, the USB interface module 107, the image processing module 111, the image control module 112, and the image processing module 113 also lose power supply to fall in power saving state too. In deep sleep mode, the CPU 101 loses power supply to its core to fall in suspend-to-ram (STR) state.

In suspend-to-ram (STR) state, the RAM 102 keeps the data stored thereon while the CPU 101 suspends working.

FIG. 7 illustrates how the MFP 1 internally provides power supply when it is in a third power saving mode (will be also referred to as "energy-related products (ErP) mode").

One step still further, in ErP mode, only the wireless LAN module 109 and a power supply cutoff circuit which controls power supply from a power source 120, receive power supply, i.e.; all devices except these portions lose power supply to fall in power saving state.

Figure 8:
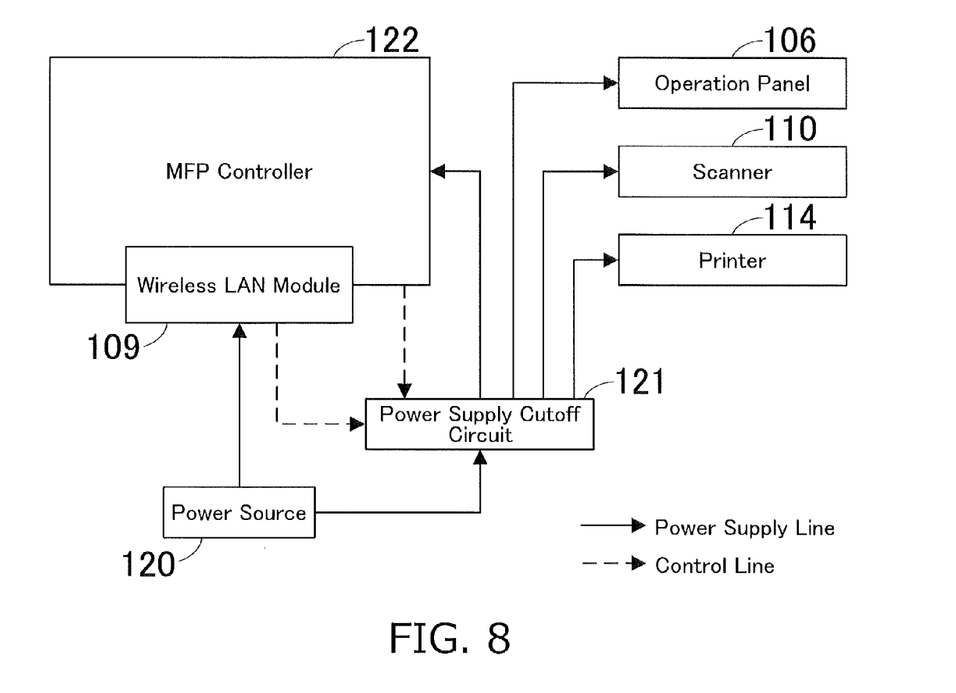
FIG. 8 is a block diagram illustrating a preferred configuration of the image forming apparatus when it is in the third power saving mode.

FIG. 8 illustrates a preferred configuration of the MFP 1 when it is in ErP mode. In ErP mode, only the wireless LAN module 109 in the MFP controller 122 and the power supply cutoff circuit 121 always receive power supply from the power source 120; the operation panel 106, the scanner 110, and the printer 114 can receive power supply through the power supply cutoff circuit 121. The MFP controller 122 cuts off power supply to these portions by controlling the power supply cutoff circuit 121; the wireless LAN module 109 provides (restores) power supply to these portions by controlling the power supply cutoff circuit 121.

Figure 9:
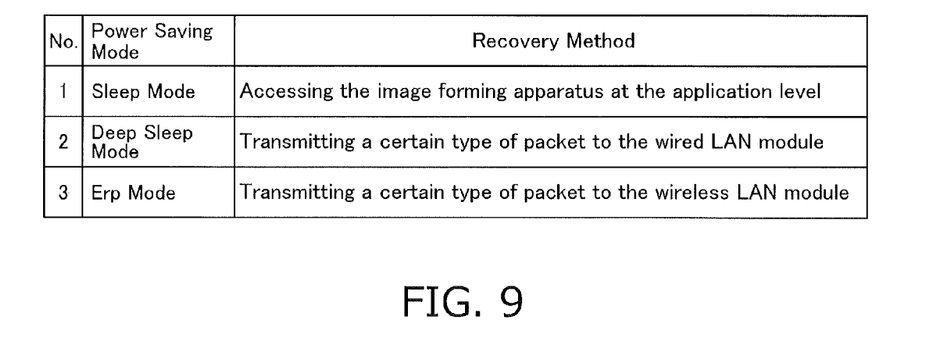
FIG. 9 is a table showing methods for the external terminal to recover the image forming apparatus from the power saving modes.

FIG. 9 is a table showing methods for the terminal 2 to recover the MFP 1 from these power saving modes.

It takes more time for the MFP 1 to recover from ErP mode than from deep sleep mode and from deep sleep mode than from sleep mode.

In this embodiment, as mentioned previously, a user who operates the portable terminal 2 can obtain an interface image, which is displayed on the operation panel 106 of the MFP 1, by accessing the MFP 1 at the application level via the network 3 and remotely operate the MFP 1 simply by touching on the operation panel 204 of the portable terminal 2 just like doing the same on the operation panel 106 of the MFP 1.

To describe the application-level access, the terminal 2 transmits an access request to the MFP 1 by an application installed on the terminal 2 itself; receiving an access permission from the MFP 1, the terminal 2 successfully accesses the MFP 1 at the application level while switching the application to "online" state.

Here, if the MFP 1 is in deep sleep mode or ErP mode when the portable terminal 2 transmits an access request, it would not be possible for the portable terminal 2 to perform a network communication with the MFP 1 because the MFP 1 is offline in that mode.

To solve this problem, in this embodiment, the portable terminal 2 implements a method of recovery from deep sleep mode and ErP mode, and accessing the MFP 1 at the application level, when an operation of the portable terminal 2 for connecting to the MFP 1 is performed.

Figure 10:
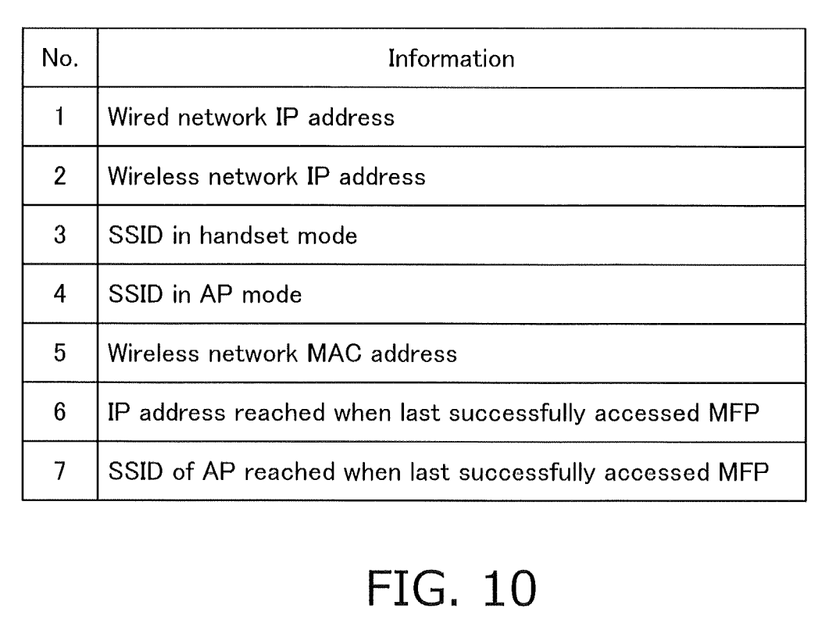
FIG. 10 is a table showing necessary information for the external terminal to access the image forming apparatus and recover the image forming apparatus from the power saving modes.

FIG. 10 is a table showing necessary information for the portable terminal 2 to access the MFP 1 and recover the MFP 1 (switch the MFP 1 to normal operation mode) from power saving mode.

As shown in the table, ID numbers 1 to 5 are given to the following items: "wired network IP address"; "wireless network IP address"; "service set identifier (SSID) in handset mode"; "SSID in AP mode"; and "wireless network MAC address", respectively. The portable terminal 2 receives these items from the MFP 1 when successfully accessing the MFP 1 at the application level. ID numbers 6 and 7 are given to the following items: "IP address reached when last successfully accessed MFP"; and "SSID of AP reached when last successfully accessed MFP". There items are stored in advance on the portable terminal 2.

Figure 11:
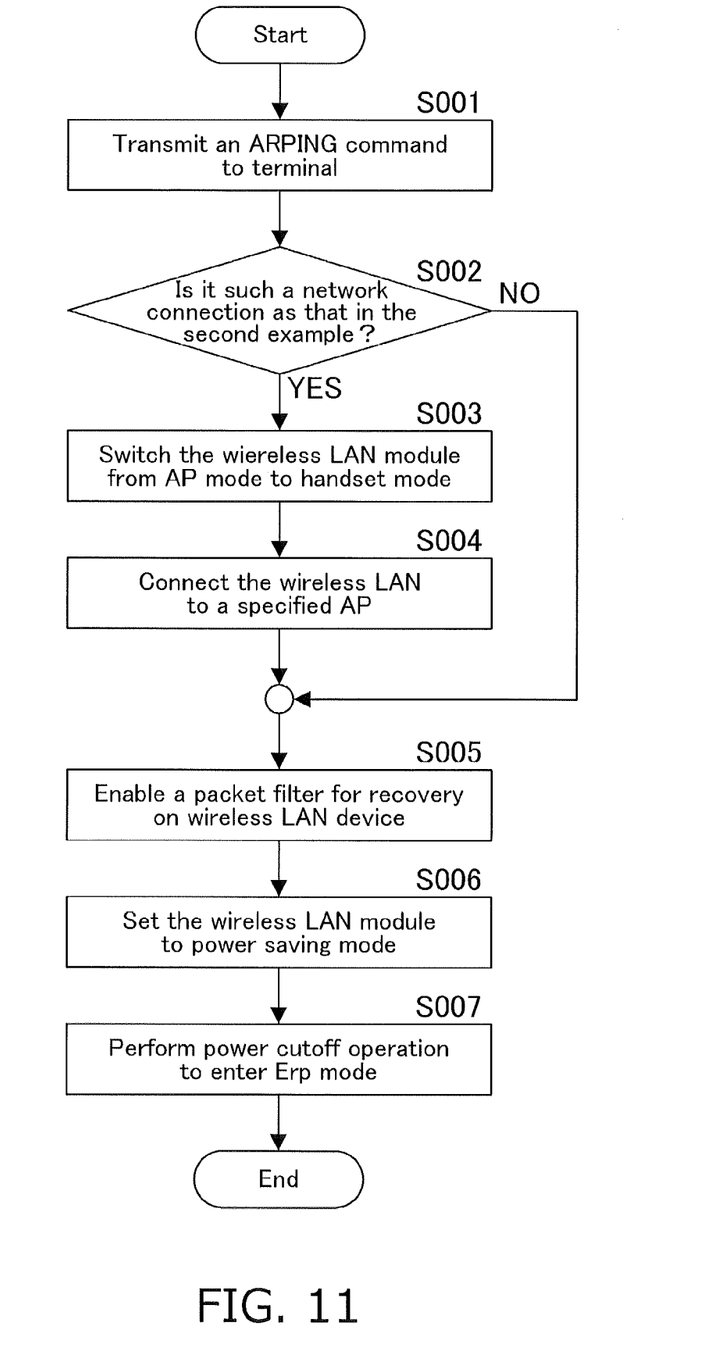
FIG. 11 is a flowchart representing the control operation of the image forming apparatus when falling to the third power saving mode.

The control operation of the MFP 1 when switching to ErP mode will be hereinafter described in detail with reference to the flowchart in FIG. 11.

In ErP mode, only the wireless LAN module 109 and the power supply cutoff circuit 121 receive power supply as illustrated in FIGS. 7 and 8. In order to restore power supply to all the other portions, it is only necessary for the wireless LAN module 109 to output an ON signal to the power supply cutoff circuit 121. An address resolution protocol (ARPING) command is transmitted to the portable terminal 2 to have an ARPING table, which contains wireless network IPs and MAC addresses, updated thereby (Step S001). In Step S002, it is judged whether or not the portable terminal 2 successfully accesses the MFP 1 using such a network as that in the second example (wireless P2P network). If the portable terminal 2 successfully accesses the MFP 1 using a wireless P2P network (YES in Step S002), the wireless LAN device is switched from AP mode to handset mode (Step S003) and the wireless LAN is connected to a user's specified AP (Step S004). Then the routine proceeds to Step S005. Handset mode, which is other than AP mode (base unit mode), is a mode by which to access the MFP 1 by reaching an AP. Back to Step S002, if the portable terminal 2 fails to access the MFP 1 using such a network as that in the second example (NO in Step S002), the routine proceeds to Step S005 directly.

A packet filter for recovery is enabled on the wireless LAN device in Step S005, and the operation mode is switched to power saving mode in Step S006. After completing all preparation for recovery as described above, the wireless LAN module 109 outputs an OFF signal to the power supply cutoff circuit 121, resulting in that all the portions except the wireless LAN module 109 and the power supply cutoff circuit 121 lose power supply (Step S007).

Figure 12:
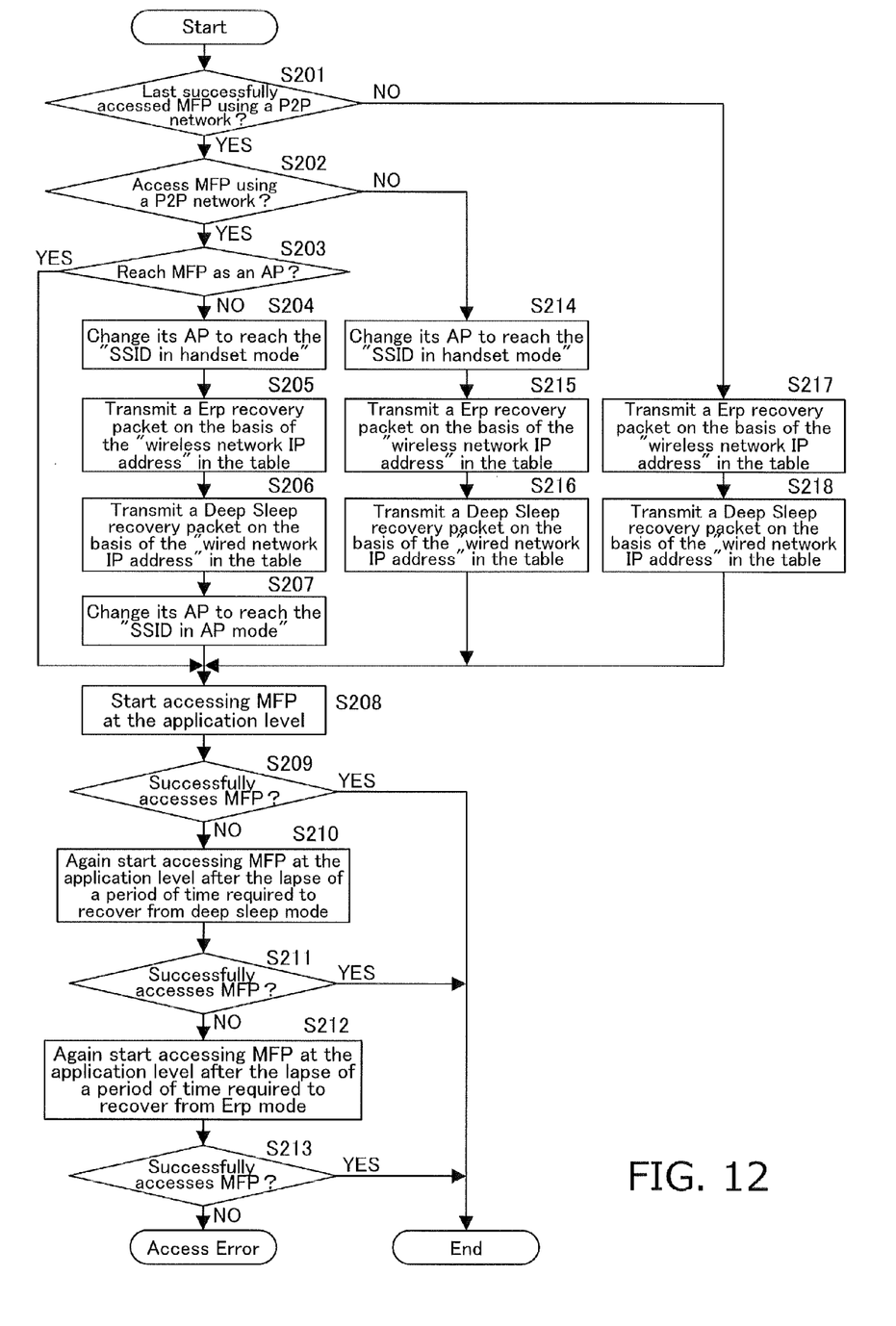
FIG. 12 is a flowchart representing the control operation of the external terminal to access the image forming apparatus at the application level and the control operation of the external terminal to recover the image forming apparatus from power saving mode.

The control operation of the external terminal to access the MFP 1 at the application level and the control operation of the external terminal to recover the MFP 1 from power saving mode will be hereinafter described in detail with reference to FIG. 12.

After successfully accessing the MFP 1 at the application level, the portable terminal 2 starts the control operation on the basis of the information in the table of FIG. 10.

A user starts operating the portable terminal 2 with specifying an IP address of the MFP 1 to access the MFP 1.

First it is judged whether or not the portable terminal 2 last successfully accessed the MFP 1 using a P2P network, i.e., whether or not the "SSID in AP mode" and the "SSID of AP reached when last successfully accessed MFP" in the table are identical with each other (Step S201). If the portable terminal 2 fails to access the MFP 1 using a P2P network, i.e., the "SSID in AP mode" and the "SSID of AP reached when last successfully accessed MFP" in the table are not identical with each other (NO in Step S201), an ErP recovery packet is generated and transmitted on the basis of the "wireless network IP address" and the "wireless network MAC address" in the table (Step S217) and a deep sleep recovery packet is generated and transmitted on the basis of the "wired network IP address" in the table (Step S218). Then the portable terminal 2 starts accessing the MFP 1 at the application level (Step S208).

If it is YES in Step S201, i.e., the "SSID in AP mode" and the "SSID of the AP of the last access" in the table are identical with each other, it is then judged whether or not the portable terminal 2 accesses the MFP 1 using a P2P network on the basis of the user's specified IP address and the "wireless network IP address" in the table (Step S202). If it is NO in Step S202, i.e., the user's specified IP address is identical with the "wireless network IP address" in the table, the portable terminal 2 changes its AP to reach the "SSID in handset mode" in the table, and connects to the network (Step S214).

Subsequently an ErP recovery packet is generated and transmitted on the basis of the "wireless network IP address" and the "wireless network MAC address" in the table (Step S215) and a deep sleep recovery packet is generated and transmitted on the basis of the "wired network IP address" in the table (Step S216). Then the portable terminal 2 starts accessing the MFP 1 at the application level (Step S208).

If it is YES in Step S202, i.e., the user's specified IP address is identical with the "wireless network IP address" in the table (Step S203), it is then judged whether or not the portable terminal 2 reaches the MFP 1 as an AP (Step S203). If the portable terminal 2 reaches the MFP 1 as an AP (YES in Step S203), it can be recognized that the MFP 1 is not in ErP mode nor in deep sleep mode, the routine therefore proceeds to Step S208 directly, in which the portable terminal 2 starts accessing the MFP 1 at the application level.

If the portable terminal 2 does not reach the MFP 1 as an AP (NO in Step S203), it can be recognized that the MFP 1 is either in ErP mode or in deep sleep mode, the recovery control operation therefore is performed.

Specifically, the portable terminal 2 changes its AP to reach the "SSID in handset mode" in the table (Step S204). Then an ErP recovery packet is generated and transmitted on the basis of the "wireless network IP address" and the "wireless network MAC address" in the table (Step S205) and a deep sleep recovery packet is generated and transmitted on the basis of the "wired network IP address" in the table (Step S206).

Subsequently the portable terminal 2 changes its AP to reach the "SSID in AP mode" in the table (Step S207) and starts accessing the MFP 1 in P2P fashion at the application level (Step S208).

It is judged in Step S209 whether or not the portable terminal 2 successfully accesses the MFP 1; if the portable terminal 2 successfully accesses the MFP 1 (YES in Step S209), the routine terminates. If the portable terminal 2 fails to access the MFP 1 (NO in Step S209), the routine waits until the portable terminal 2 again starts accessing the MFP 1 at the application level after the lapse of a period of time required for the MFP 1 to recover from deep sleep mode (Step S210).

It is judged in Step S211 whether or not the portable terminal 2 successfully accesses the MFP 1 at the application level (YES in Step S211); if the portable terminal 2 successfully accesses the MFP 1 (YES in Step S211), the routine terminates. If the portable terminal 2 fails to access the MFP 1 (NO in Step S211), the routine waits until the portable terminal 2 again starts accessing the MFP 1 at the application level after the lapse of a period of time required for the MFP 1 to recover from ErP mode (Step S212).

It is judged in Step S213 whether or not the portable terminal 2 successfully accesses the MFP 1 at the application level; if the portable terminal 2 successfully accesses the MFP 1 (YES in Step S213), the routine terminates. If the portable terminal 2 fails to access the MFP 1 at the application level (NO in Step S213), the situation is determined to be an access error.

As described above, the portable terminal 2 is allowed to successfully switch the MFP 1 to normal operation mode regardless of: which power saving mode the MFP 1 is in, sleep mode, deep sleep mode, or ErP mode; or the access path between the MFP 1 and the portable terminal 2.

The present invention, whose one embodiment has been described in detail herein, can solve the unsolved problems by its following modes.

[1] An image forming system comprising: an image forming apparatus and an external terminal being connected to each other via a network, the external terminal being capable of operating the image forming apparatus, the image forming apparatus comprising:

a controller comprising: a CPU containing an embedded wired LAN module, the CPU having a STR function for reducing power consumption by cutting off core power supply and a recovery function for terminating the STR function by restoring core power supply when the wired LAN module receives a certain type of packet; and a wireless LAN module having a control function for outputting a control signal when the wireless LAN module receives a certain type of packet while the image forming apparatus is saving power; and a power supply cutoff controller that controls cutting off or providing power supply to a load, wherein the wireless LAN module outputs a control signal to the power supply cutoff controller; and if the control signal is effective, the power supply cutoff controller provides power supply to the load, the image forming apparatus having the following three power saving modes:

(1) a first power saving mode for cutting off power supply to the load;

(2) a second power saving mode for cutting off power supply to the load and setting at least the CPU of the controller to STR state; and (3) a third power saving mode for providing power supply only to a wireless LAN module and the power supply cutoff controller, the external terminal being capable of recovering the image forming apparatus from the first, second, and third power saving mode by the following respective methods:

(1) a first method of accessing the image forming apparatus at the application level;

(2) a second method of transmitting a certain type of packet to the wired LAN module; and (3) a third method of transmitting a certain type of packet to the wireless LAN module, wherein the external terminal implements both the second and third method when the external terminal accesses the image forming apparatus at the application level.

[2] The image forming system as recited in the foregoing item [1], wherein when the external terminal accesses the image forming apparatus at the application level, the external terminal firstly implements the third method of transmitting a certain type of packet to the wireless LAN module, secondly implements the second method of transmitting a certain type of packet to the wired LAN module, and thirdly transmits a command for allowing an application-level access.

[3] The image forming system as recited in the foregoing item [2], wherein if failing to access the image forming apparatus at the application level without any response therefrom, the external terminal transmits a command for allowing an application-level access once again after the lapse of a period of time required for the image forming apparatus to recover from the power saving mode.

[4] The image forming system as recited in the foregoing item [2], wherein: if failing to access the image forming apparatus at the application level without any response therefrom, the external terminal transmits a command for allowing an application-level access once again after the lapse of a period of time required for the image forming apparatus to recover from the second power saving mode; and then if again failing to access the image forming apparatus at the application level without any response therefrom, the external terminal transmits a command for allowing an application-level access still once again after the lapse of a period of time required for the image forming apparatus to recover from the third power saving mode.

[5] The image forming system as recited in any one of the foregoing items [1] to [4], wherein the external terminal is capable of building:

(1) a first access path by wirelessly reaching a specified access point in the same network while the image forming apparatus is connected to the network by wired and wireless LAN; and (2) a second access path by directly reaching the image forming apparatus by wireless LAN, wherein if entering the third power saving mode while the external terminal is accessing the image forming apparatus using the second access path, the image forming apparatus switches the wireless LAN module from access point mode to handset mode and is connected to a set access point.

[6] The image forming system as recited in the foregoing item [5], wherein the portable terminal changes the order of implementation of the methods for recovering the image forming apparatus from each of the power saving mode, depending on the condition of the access path for an application-level access and the condition of the access of the portable terminal to the access point, when the application-level access from the portable terminal to the image forming apparatus is implemented.

[7] The image forming system as recited in any one of the foregoing items [1] to [6], wherein the external terminal never recovers the image forming apparatus from the second power saving mode by the third method, never recovers the image forming apparatus from the third power saving mode by the second method either; the external terminal therefore recovers the image forming apparatus from the second and third power saving mode, respectively, by the second and third method.

[8] A method for an image forming system comprising an image forming apparatus and an external terminal being connected to each other via a network, the external terminal being capable of operating the image forming apparatus, the method allowing the external terminal to recover the image forming apparatus from power saving mode, the image forming apparatus comprising:

a controller comprising: a CPU containing an embedded wired LAN module, the CPU having a STR function for reducing power consumption by cutting off core power supply and a recovery function for terminating the STR function by restoring core power supply when the wired LAN module receives a certain type of packet; and a wireless LAN module having a control function for outputting a control signal when the wireless LAN module receives a certain type of packet while the image forming apparatus is saving power; and a power supply cutoff controller that controls cutting off or providing power supply to a load, wherein the wireless LAN module outputs a control signal to the power supply cutoff controller; and if the control signal is effective, the power supply cutoff controller provides power supply to the load, the image forming apparatus having the following three power saving modes:

(1) a first power saving mode for cutting off power supply to the load;

(2) a second power saving mode for cutting off power supply to the load and setting at least the CPU of the controller to STR state; and (3) a third power saving mode for providing power supply only to a wireless LAN module and the power supply cutoff controller, the external terminal being capable of recovering the image forming apparatus from the first, second, and third power saving mode by the following respective methods:

(1) a first method of accessing the image forming apparatus at the application level;

(2) a second method of transmitting a certain type of packet to the wired LAN module; and (3) a third method of transmitting a certain type of packet to the wireless LAN module, wherein the external terminal implements both the second and third method when the external terminal accesses the image forming apparatus at the application level.

[9] An image forming apparatus to be employed in the image forming system as recited in any one of the foregoing items [1] to [7].

According to the aforementioned modes [1] and [8] of the invention, the external terminal implements both the second and third method when the first method is implemented. The external terminal is thus allowed to successfully switch the image forming apparatus to normal operation mode whichever power saving mode the image forming apparatus is in.

According to the aforementioned modes [2] to [4] of the invention, the external terminal is allowed to successfully recover the image forming apparatus from any of the first, second, and third power saving mode.

According to the aforementioned modes [5] and [6] of the invention, the external terminal is allowed to successfully recover the image forming apparatus from any of the power saving modes without depending on the access path the external terminal uses to access the image forming apparatus.

According to the aforementioned mode [7] of the invention, the image forming system makes better use of advantages of the present invention.

According to the aforementioned mode [8] of the invention, this method allows the external terminal to successfully recover the image forming apparatus from any of the first, second, and third power saving mode.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming system comprising: an image forming apparatus and an external terminal being connected to each other via a network, the external terminal being capable of operating the image forming apparatus, the image forming apparatus comprising:
a controller comprising:
a CPU containing an embedded wired LAN module, the CPU having a STR state for reducing power consumption by cutting off core power supply and a recovery function for terminating the STR state by restoring the core power supply when the wired LAN module receives a certain type of packet, and
a wireless LAN module having a control function for outputting a control signal when the wireless LAN module receives a second certain type of packet while the image forming apparatus is saving power; and
a power supply cutoff controller that controls cutting off or providing power supply to a load,
wherein when the wireless LAN module outputs the control signal to the power supply cutoff controller, the power supply cutoff controller provides power supply to the load if the control signal is effective,
the image forming apparatus having the following three power saving modes:
(1) a first power saving mode for cutting off power supply to the load;
(2) a second power saving mode for cutting off power supply to the load and setting at least the CPU of the controller to the STR state; and
(3) a third power saving mode for providing power supply only to the wireless LAN module and the power supply cutoff controller,
the external terminal being capable of recovering the image forming apparatus from the first, second, and third power saving mode by the following respective methods:
(1) a first method of the external terminal accessing the image forming apparatus at the application level;
(2) a second method of the external terminal transmitting the certain type of packet to the wired LAN module; and
(3) a third method of the external terminal transmitting the second certain type of packet to the wireless LAN module,
wherein the external terminal implements both the second method and the third method before the external terminal implements the first method to access the image forming apparatus at the application level.

2. The image forming system as recited in claim 1, wherein when the external terminal accesses the image forming apparatus at the application level, the external terminal firstly implements the third method of transmitting the second certain type of packet to the wireless LAN module, secondly implements the second method of transmitting the certain type of packet to the wired LAN module, and thirdly transmits a command for allowing an application-level access.

3. The image forming system as recited in claim 2, wherein if failing to access the image forming apparatus at the application level without any response therefrom, the external terminal transmits a command for allowing the application-level access once again after the lapse of a period of time required for the image forming apparatus to recover from the power saving mode.

4. The image forming system as recited in claim 2, wherein: if failing to access the image forming apparatus at the application level without any response therefrom, the external terminal transmits a command for allowing the application-level access once again after the lapse of a period of time required for the image forming apparatus to recover from the second power saving mode; and then if again failing to access the image forming apparatus at the application level without any response therefrom, the external terminal transmits a command for allowing the application-level access still once again after the lapse of a period of time required for the image forming apparatus to recover from the third power saving mode.

5. The image forming system as recited in claim 1, wherein the external terminal is capable of building:
   (1) a first access path by wirelessly reaching a specified access point in the same network while the image forming apparatus is connected to the network by wired and wireless LAN; and
   (2) a second access path by directly reaching the image forming apparatus by wireless LAN,
   wherein if entering the third power saving mode while the external terminal is accessing the image forming apparatus using the second access path, the image forming apparatus switches the wireless LAN module from access point mode to handset mode and is connected to a set access point.

6. The image forming system as recited in claim 5, wherein the portable terminal changes the order of implementation of the methods for recovering the image forming apparatus from each of the power saving mode, depending on the condition of the access path for an application-level access and the condition of the access of the portable terminal to the access point, when the application-level access from the portable terminal to the image forming apparatus is implemented.

7. The image forming system as recited in claim 1, wherein the external terminal never recovers the image forming apparatus from the second power saving mode by the third method, never recovers the image forming apparatus from the third power saving mode by the second method either; the external terminal therefore recovers the image forming apparatus from the second and third power saving mode by the second method and the external terminal recovers the image forming apparatus from the third power saving mode by the third method.

8. The image forming system as recited in claim 1, wherein the CPU suspends working in the STR state.

9. A method for an image forming system comprising an image forming apparatus and an external terminal being connected to each other via a network, the external terminal being capable of operating the image forming apparatus, the method allowing the external terminal to recover the image forming apparatus from power saving mode, the image forming apparatus comprising:
   a controller comprising:
      a CPU containing an embedded wired LAN module, the CPU having a STR state for reducing power consumption by cutting off core power supply and a recovery function for terminating the STR state by restoring the core power supply when the wired LAN module receives a certain type of packet, and
      a wireless LAN module having a control function for outputting a control signal when the wireless LAN module receives a second certain type of packet while the image forming apparatus is saving power; and
   a power supply cutoff controller that controls cutting off or providing power supply to a load,
   wherein when the wireless LAN module outputs the control signal to the power supply cutoff controller, the power supply cutoff controller provides power supply to the load if the control signal is effective,
   the image forming apparatus having the following three power saving modes:
   (1) a first power saving mode for cutting off power supply to the load;
   (2) a second power saving mode for cutting off power supply to the load and setting at least the CPU of the controller to STR state; and
   (3) a third power saving mode for providing power supply only to a wireless LAN module and the power supply cutoff controller,
   the external terminal being capable of recovering the image forming apparatus from the first, second, and third power saving mode by the following respective methods:
   (1) a first method of accessing the image forming apparatus at the application level;
   (2) a second method of transmitting a certain type of packet to the wired LAN module; and
   (3) a third method of transmitting a certain type of packet to the wireless LAN module,
   wherein the external terminal implements both the second and third method when the external terminal accesses the image forming apparatus at the application level.

10. A non-transitory computer-readable recording medium storing a program for controlling an external terminal, which is employed in the image forming system recited in claim 1, the control program causing a computer to execute processing comprising the steps of:
   implementing a second method of transmitting the certain type of packet to the wired LAN module and a third method of transmitting the second certain type of packet to the wireless LAN module, when the external terminal accesses the image forming apparatus at the application level.

* * * * *